United States Patent Office 2,694,738
Patented Nov. 16, 1954

2,694,738

PROCESS FOR STABILIZATION OF NUCLEAR HALOGENATED AROMATIC HYDROCARBONS

John T. Rucker, Lewiston, N. Y., assignor to Hooker Electrochemical Company, Niagara Falls, N. Y., a corporation of New York No Drawing. Application November 13, 1951, Serial No. 256,152

7 Claims. (Cl. 260—650)

The present invention relates to a novel process for stabilizing halogenated aromatic hydrocarbons against decomposition whereby discoloration, acidity and sludge formation are minimized. More specifically, this invention relates to a stabilization process for rendering nuclear chlorinated aromatic hydrocarbons sufficiently stable for use in electrical apparatus such as capacitors, transformers, circuit breakers, cables and the like, with only a minimum of accompanying corrosion of metallic parts, due to the decomposition products of the chlorinated aromatic hydrocarbons.

Synthetic materials which are nonflammable, electrically insulating and which when decomposed by an electric arc evolve nonexplosive gaseous mixtures are referred to as Askarels. A particle group of synthetic chemicals which have found wide use in industry as Askarels are chemicals of the nuclear chlorinated aromatic classes such as polychlorodiphenyl, polychlorobenzene, and mixtures thereof, and specifically compositions comprising pentachlorodiphenyl and trichlorobenzene which are marketed by the General Electric Company under the trade-name of Pyranol. In order to be useful as a dielectric, the nuclear chlorinated aromatics must possess high insulation resistance, low power factor, low solidification point, nonflammability without developing flammable gases on thermal decomposition, substantial uniformity of capacity throughout wide temperature ranges, good stability against decomposition, while still possessing other important characteristics. In view of these exacting requirements for nuclear chlorinated aromatic hydrocarbons to be used as dielectric materials, the raw materials selected for use in the compounded Askarel must meet rigid specifications with regard to stability against thermal decomposition, particularly when in contact with metals, and, they must have good color, low sludge formation characteristics, low solidification point, satisfactory boiling range, and in addition must possess the other essential characteristics of a dielectric that have been deemed necessary for commercial use. Each of the nuclear chlorinated aromatic hydrocarbon raw materials selected for use in the finally compounded dielectric composition must meet specifications with respect to thermal decomposition at least as rigid as those required for the final mixture to be used in the field.

The commercial processes of manufacture for nuclear chlorinated aromatic hydrocarbons employed in industry have not been capable of producing a product which meet these exacting specifications without utilization of impractical or uneconomical close-cut fractionation procedures. A typical process for making trichlorobenzene comprises chlorinating benzene in an iron apparatus, or in the presence of catalytic amounts of iron chloride, until about 30 to 40 per cent of the organic is converted to trichlorobenzene. The resulting product is fractionated to remove most of the chlorobenzenes below and above the trichloro stage. The trichlorobenzene fraction recovered is not sufficiently stable for use as a dielectric, therefore it is subjected to purification by a combination of treatments, as will be more fully disclosed hereinafter. However, even when employing close fractionation procedures, the product is still unsatisfactory for dielectric use because although its stability has been improved by removal of impurities, its solidification point has been raised. Because of this, various purification and/or stabilization techniques have been proposed, which do not adversely affect the freezing properties, in order to provide a product of reasonable cost and sufficient stability, for use in commercial dielectric compositions.

Among the various purification techniques which have been suggested or used to refine or purify nuclear chlorinated aromatic hydrocarbons so that they possess a stability sufficient for use in dielectrics, without accompanying loss of the other essential characteristics of a dielectric that have been deemed necessary for commercial use, have been a treatment of the chlorinated material involving filtration through fuller's earth or Attapulgus clay, alumina, silica gel, activated carbon, or other adsorbents. Still another method involves heating the nuclear chlorinated aromatic material to a temperature of about 150 to 250° C. for several hours in the presence of aluminum or iron chloride. Still another method involves washing the freshly prepared chlorinated compound with an aqueous solution of an alkali, separating the two layers formed and then treating the chlorinated organic compound with about five per cent by weight of sodium hydroxide at elevated temperatures, then followed by an additional water washing and a distillation to recover purified product. It has also been proposed to treat nuclear chlorinated aromatic compounds commercially available on the market with about 0.15 per cent of metallic sodium at 100 to 110° C., then washing with distilled water and filtering through fuller's earth, and drying to recover the purified product.

Employment of a selected plurality of these techniques for purifying nuclear chlorinated aromatic for dielectric use has enabled the production of a product acceptable for commercial use because of the non-availability of a better product at a reasonable cost; however, because of the importance of eliminating more of the corrosion of metallic parts which accompanies the use of nuclear chlorinated aromatics in electrical apparatus, extended searches for improved and more effective methods of purification and stabilization are being continually made. Moreover, with the commercial introduction of trichlorobenzene made by the pyrolysis of certain mixtures of isomers of benzene hexachloride (hexachlorocyclohexane) which remain after the gamma isomer has been isolated, and with the accompanying instability and impurity of trichlorobenzene so produced, even more effective purification treatments than those proposed heretofore are required in order to allow for the production of nuclear chlorinated aromatics suitable for dielectric use.

I have now found a new method for rendering nuclear chlorinated aromatic hydrocarbons sufficiently pure and stable for use as dielectrics in electric apparatus. In particular, this invention relates to a method for stabilizing nuclear chlorinated aromatic hydrocarbons by heating the material to be stabilized with an alkali material in the presence of an aliphatic polyhydric alcohol.

This invention will be more readily understood from a consideration of the following examples which illustrate the detailed practice of preferred embodiments of the invention and which also show certain features of the prior art so that comparisons may be made; they are not to be construed as limiting, except as defined in the appended claims.

In the following examples, numbered I through XI, the stabilities of the materials were determined by a test which comprises refluxing a 350 cc. sample of the material to be tested in a 500 cc. flask for a period of 72 hours, then distilling to dryness. The color of the sample before and after refluxing was measured by employing the Hazen Color Scale and the amount of residue remaining after distillation was measured by visual inspection, and assigned a relative increasing value of None, Faint Trace, Trace, Slight, Medium, and Large. This stability test measuring changes in darkening of color and development of sludges or residues under thermal conditions is an accelerated measure of the amount of decomposition encountered when the materials under test are in actual use in electrical apparatus.

*Example I*

A sample of commercial trichlorobenzene prepared by chlorinating benzene in the presence of catalytic amounts of iron chloride was fractionated after neutralization of the iron chloride. A fraction of trichlorobenzene having a freezing point of about 6° C. and a specific gravity of 1.471 at 15.5° C. was recovered by collecting product starting at specific gravity of 1.428 and ending at specific gravity of 1.478 measured at a temperature of 15.5° C. This fraction was purified by mixing it with two per cent by weight of activated fuller's earth or Attapulgus clay, at a temperature of 40° C., for a period of two hours, and thereafter filtering. The stability of this material was determined by the accelerated thermal stability test. The results obtained were as follows:

Color before test _____ 5
Color after test _____ 160
Residue _____ Medium
Freezing point _____ 6° C.

Example II

A sample of the trichlorobenzene resulting from the clay treatment step of Example I was given a second clay treatment under the same conditions and then subjected to the accelerated thermal decomposition test. The results obtained were as follows:

Color before test_____ 5
Color after test_____ 50
Residue_____ Slight
Freezing point_____ 6° C.

Example III

A sample of the material resulting from the clay treatment of Example I was treated with flake caustic soda at about 160° C. for two hours and then separated. This material was then given the standard fuller's earth treatment described in Example I, then subjected to the stability test. The results obtained were as follows:

Color before test_____ 5
Color after test_____ 50
Residue_____ Slight
Freezing point_____ 6° C.

Example IV

A sample of trichlorobenzene resulting from the chlorination of Example I, which had not been subjected to the clay treatment of Example I, was carefully fractionated and a fraction boiling at a temperature between 205 and 246° C. was separated and given the fuller's earth treatment described in Example I. The stability of this material, upon being subjected to the stability test, was as follows:

Color before test_____ 5
Color after test_____ 900
Residue _____ Medium plus
Freezing point_____ 4° C.

Example V

Another sample of trichlorobenzene resulting from the chlorination of Example I, which had not been subjected to the standard clay treatment, was carefully fractionated and a fraction boiling at a temperature between 208 and 213° C. was recovered. This material was given the fuller's earth treatment described in Example I. The material was then subjected to the stability test. The results obtained were as follows:

Color before test_____ 5
Color after test_____ 70
Residue _____ Slight
Freezing point_____ 12° C.

Example VI

A sample of the trichlorobenzene resulting from the clay treatment step of Example I was treated at a temperature of 160° C., for a period of two hours, with a mixture of five per cent by weight of flake caustic soda and 0.33 per cent by weight of ethylene glycol. The material was separated and given the standard clay treatment before being subjected to the stability test; the results obtained were as follows:

Color before test_____ 5
Color after test_____ 5
Residue_____ None
Freezing point_____ 6° C.

Example VII

A sample of the trichlorobenzene resulting from the clay treatment step of Example I was treated at a temperature of 160° C., for a period of three and one-half hours with a mixture of five per cent by weight of flake caustic soda and 0.33 per cent by weight diethylene glycol and then separated. The material recovered was given the standard clay treatment before being subjected to the stability test; the results obtained were as follows:

Color before test_____ 5
Color after test_____ 5
Residue_____ None
Freezing point_____ 6° C.

Example VIII

A sample of the trichlorobenzene resulting from the clay treatment step of Example I was treated at a temperature of 160° C., for a period of three and one-half hours with a mixture of five per cent by weight of flake caustic soda and 0.33 per cent by weight of a polyethylene glycol sold by Carbide & Carbon Chemicals Corporation under the trade name "Carbowax 1500" and then separated. The material recovered was given the standard clay treatment and then subjected to the stability test; the results obtained were as follows:

Color before test_____ 5
Color after test_____ 10
Residue _____ Faint trace
Freezing point_____ 6° C.

Example IX

A sample of the trichlorobenzene resulting from the clay treatment step of Example I was treated at a temperature of 140° C., for a period of six hours, with a mixture of five per cent by weight of flake caustic soda and 0.33 per cent by weight diethylene glycol and then separated. The material recovered was given the standard clay treatment and then subjected to the stability test; the results obtained were as follows:

Color before test_____ 5
Color after test_____ 8
Residue_____ None
Freezing point_____ 6° C.

Example X

A sample of the trichlorobenzene resulting from the clay treatment step of Example I was treated at a temperature of 200° C., for a period of two hours, with a mixture of five per cent by weight of flake caustic soda and 0.33 per cent by weight diethylene glycol and then separated. The material recovered was given the standard clay treatment and then subjected to the stability test; the results obtained were as follows:

Color before test_____ 5
Color after test_____ 10
Residue _____ Faint trace
Freezing point_____ 6° C.

Example XI

A sample of the trichlorobenzene was prepared by the pyrolysis, at a temperature of about 250 to 300° C., of a mixture of isomers of benzene hexachloride remaining after the gamma isomer was removed. The trichlorobenzene recovered by distillation had a pungent odor of hydrogen chloride. A sample of this pyrolytic trichlorobenzene was treated at a temperature of 160° C., for a period of two hours, with a mixture of five per cent by weight of flake caustic soda and 0.33 per cent by weight of ethylene glycol and then separated. The material recovered was given the standard clay treatment before being subjected to the stability test; the results obtained were as follows:

Color before test_____ 5
Color after test_____ 5
Residue_____ None
Freezing point_____ 5° C.

In the examples which follow, numbered XII through XVII, the stability of the materials was determined by an accelerated thermal decomposition test which comprises heating a 200 cc. sample of the material to be tested in a flask provided with a reflux condenser and a water trap, in the presence of one gram of aluminum foil three mills in thickness, for a period of six hours, at a temperature of 210° C. After this treatment, the material in the flask and the material collected in the trap were combined and analyzed for free chlorides by a special analytical technique employing silver nitrate; in this test, the greater the proportion of chlorides found, the greater is the instability of the material.

*Example XII*

A sample of trichlorobenzene having a clay treatment, prepared in a manner after that described in Example I, was subjected to the stability test just described. On analysis of the residual material in the flask and the material collected in the trap 4.0 parts per million of total free chlorides were found.

*Example XIII*

A sample of trichlorobenzene having a clay treatment, prepared in a manner after that described in Example I, was treated at a temperature of between 125–130° C. for a period of about 22 hours with five per cent by weight of a ten per cent aqueous solution of sodium hydroxide. The material remaining after this treatment was steam distilled at a temperature of about 125 to 150° C., washed with distilled water, then dried with flake caustic soda and filtered. This material was subjected to the test described above and on analysis was found to have developed 2.7 parts per million of total free chloride.

*Example XIV*

A sample of trichlorobenzene having a clay treatment, prepared in a manner after that described in Example I, was treated at a temperature of between 140–150° C., for a period of eight hours, with one-half per cent by weight of anhydrous aluminum chloride. The material remaining after this treatment was washed twice with an equal volume of five per cent by weight of aqueous hydrochloric acid, then washed once with an equal volume of water, then washed twice with dilute aqueous sodium hydroxide, then washed twice with distilled water, then dried over flake caustic soda and filtered. The material was subjected to the stability test and found to develop 3.6 parts per million of total free chloride.

*Example XV*

A sample of trichlorobenzene having a clay treatment, prepared in a manner after that described in Example I, was treated at reflux temperature, for a period of 16 hours with a mixture of one-half per cent by weight of sodium hydroxide and one and one-half per cent by weight of methanol. The material remaining after this treatment was washed twice with dilute aqueous sodium hydroxide, then washed twice with distilled water, then dried over flake caustic soda and filtered. The material was subjected to the stability test and found to develop 1.2 parts per million of total free chloride.

*Example XVI*

A sample of trichlorobenzene having a clay treatment, prepared in a manner after that described in Example I, was treated at reflux temperature, for a period of 16 hours with a mixture of one-half per cent by weight of sodium methylate prepared by dissolving one-quarter per cent by weight of metallic sodium in one and one-half per cent by weight of methanol. The material remaining after this treatment was washed twice with dilute aqueous sodium hydroxide, then washed twice with distilled water, then dried over flake caustic soda and filtered. The material was subjected to the stability test and was found to develop 1.2 parts per million of total free chloride.

*Example XVII*

A sample of pyrolytic trichlorobenzene prepared by the method described in Example XI was treated at a temperature of 160° C., for a period of two hours, with a mixture of five per cent by weight of flake caustic soda and 0.33 per cent by weight of ethylene glycol. The material remaining after this treatment was isolated, given the clay treatment and then subjected to the stability test and found to develop 0.29 parts per million of total free chloride.

Referring to the foregoing examples, it will be noted that Examples I to V, which illustrate stabilization and/or purification techniques of the prior art, show that the methods employed resulted in an improvement in the stability of the materials treated; however, in none of them was a material produced which is entirely satisfactory for use as a dielectric in electrical apparatus. This is evidenced from a correlation of the accelerated thermal decomposition test employed with the amount of actual decomposition and accompanying corrosion encountered when said materials are in use in the field, which correlation established that material developing a color of more than 10 Hazen Color units and more than "Trace" amounts of sludge or residue is not entirely satisfactory. Example I shows that trichlorobenzene resulting from prior art commercial operations is unsuitable for use as a dielectric without further purification. Further purifications of such commercial trichlorobenzene involving a second fuller's earth treatment, as in Example II, and/or the flake caustic soda treatment, as in Example III, do not result in the production of a product satisfactory for use as a dielectric. Moreover, with each added stabilization treatment, the costs increase, making the entire procedure uneconomical and impracticable for commercial scale operations. These examples also show that there is no apparent change in the freezing point of the material being treated by the stabilization procedures described. Example IV shows that a wider fractionation-cut having a lower freezing point, which is a desirable property in connection with use of these materials as dielectrics, has poor stability even after being subjected to the standard fuller's earth treatment which is described in Example I. Example V shows that a narrow fractionation-cut having improved stability over the wide fractionation-cut of Example IV may be recovered, but that this materail is still unsuitable for use as a dielectric, because of its increased freezing point. In addition, the procedure of Example V is unsatisfactory for various other reasons, including the fact that a low yield of only a moderately stable product is recovered.

Examples VI through XI represent specific embodiments of the present invention. From these, it will be noted that by employing the simple procedural steps described, remarkably stable materials are recovered, all of which meet the exacting specifications which are required for use of the materials as dielectrics.

Examples XII through XVI illustrate stabilization and/or purification techniques of the prior art, which were evaluated by an accelerated thermal decomposition test conducted in the presence of a metal, and, Example XVII shows a procedure of this invention, evaluated by the same test. The test employed in these examples has been correlated with the amount of actual decomposition and accompanying corrosion encountered when the materials are used in the field in electrical apparatus and the correlation establishes that material developing more than one part per million of total free chlorides under the conditions of the test is not entirely satisfactory for commercial use. Example XII shows that commercial trichlorobenzene which has been given the standard clay purification treatment, developed four parts per million of total free chlorides. The addition of the purification steps and procedures described in Examples XIII and XIV do not improve the stability to the point where the material being treated is satisfactory for commercial use. Examples XV and XVI show that a significant improvement in stability is realized by employing the added procedures described therein, but that, even with these, an entirely satisfactory product is not obtained. Moreover, the time and materials consumed, in addition to the added equipment required to put these procedures into effect, make the procedures impractical for commercial adoption. Example XVII illustrates a preferred practice of this invention and it shows the remarkable stability realized, even when using the inherently more unstable pyrolytic trichlorobenzene, with only a minimum of time, materials and equipment being required to accomplish it.

In order that this invention may be readily understood, the foregoing examples, in which specific quantities of certain materials were disclosed, have been given. It should be emphasized that this invention is not intended to be limited by the specific disclosures in the examples of this invention, especially since in place of caustic soda employed therein, potassium and other alkali metal hydroxides and carbonates have been found equally suitable for the purpose of this invention. Also, various other aliphatic polyhydric alcohols, other than the glycols used in the examples, including propylene glycol, butylene glycol, glycerine and polyglycols, e. g., triethylene glycol have been found to be useful in the practice of this invention. The ratio of glycol to alkali and the proportion of these materials to be used in the stabilization of the chlorinated aromatic hydrocarbons may vary and it is only necessary to use that amount of material which will give the desired degree of stabilization. A ratio of between about 0.01 to 5 parts of glycol and about 0.1 to 20 parts of alkali to 100 parts of chlorinated aromatic hydrocarbon have been found to be particularly effective for stabilizing the nuclear chlorinated aromatic hydrocarbons presently employed in the commercial Pyranols on the market today. Among the nuclear chlorinated aromatic hydrocarbons which may be effectively stabilized and/or purified by the methods of this invention are polychlorobenzenes, such as tri- and tetrachlorobenzenes; polychlorodiphenyls, such as pentachlorodiphenyl, chlorinated diphenyl oxide, chlorinated diphenyl methane, etc.; alkyl chlorinated benzenes and toluenes, such as, diethyl chlorinated benzene, butyl chlorinated benzene, and those having less than seven carbon atoms in the hydrocarbon side chain; chlorinated naphthalenes; and mixtures thereof. The temperature employed in the stabilization treatment of this invention is a factor which varies with the time for treatment to be employed, in addition to still other factors; however, in order to realize the maximum degree of stabilization under the most economical conditions, I have found that temperatures of above about 140° C. should be employed when effecting the stabilization of the components of the commercial Pyranol mixtures.

I claim:

1. In a method for making nuclear chlorinated aromatic materials selected from the group consisting of polychlorobenzenes, polychlorodiphenyls, chlorinated diphenyl oxide, chlorinated diphenyl methane, alkyl chlorinated benzenes having less than seven carbon atoms in the hydrocarbon side chain, chlorinated naphthalenes and mixtures thereof, stable for use as a dielectric, the step comprising: heating the material to be stabilized with between 0.1 and 20 per cent by weight of an alkali in the presence of between 0.01 and 5 per cent by weight of an aliphatic polyhydric alcohol at a temperature above above 140 degrees centigrade for a time sufficient to render the material stable and separating the nuclear chlorinated aromatic material therefrom.

2. The method of claim 1 wherein the nuclear chlorinated aromatic hydrocarbon is a polychlorobenzene.

3. The method of claim 1 wherein the alkali is selected from the group consisting of the alkali metal and alkaline earth metal hydroxides and carbonates.

4. The method of claim 1 wherein the aliphatic polyhydric alcohol is an aliphatic glycol.

5. The method of claim 1 wherein the aliphatic glycol is ethylene glycol.

6. The method of claim 1 wherein the heating is effected at a temperature of about 160° C. for a period of about two hours.

7. In a method for making polychlorobenzenes stable for use as a dielectric, the steps comprising: heating the polychlorinated benzene with about five per cent by weight of caustic soda in the presence of about one-third per cent by weight of ethylene glycol for a period of about two hours at a temperature of about 160° C. and separating the polychlorinated benzenes therefrom.

References Cited in the file of this patent

UNITED STATES PATENTS

| Number | Name | Date |
|---|---|---|
| 1,953,070 | Brown et al. | Apr. 3, 1934 |